United States Patent
Lee et al.

(10) Patent No.: US 7,463,103 B2
(45) Date of Patent: Dec. 9, 2008

(54) CHAOTIC SIGNAL GENERATOR FOR ULTRA WIDE BAND COMMUNICATION SYSTEM

(75) Inventors: Kwang Du Lee, Cheonlanam-do (KR); Chang Soo Yang, Kyungki-do (KR); Kyu Hwan An, Seoul (KR); Kyuong Ree Kim, Seoul (KR)

(73) Assignee: Samsung Electronic-Mechanics Co., Ltd., Suwon, Kyungki-Do (KR)

( * ) Notice: Subject to any disclaimer, the term of this patent is extended or adjusted under 35 U.S.C. 154(b) by 173 days.

(21) Appl. No.: 11/428,786

(22) Filed: Jul. 5, 2006

(65) Prior Publication Data

US 2007/0008742 A1    Jan. 11, 2007

(30) Foreign Application Priority Data

Jul. 5, 2005    (KR)    .................... 10-2005-0060391

(51) Int. Cl.
    *H03L 7/07* (2006.01)
(52) U.S. Cl. ............................................ 331/78; 331/2
(58) Field of Classification Search ................. 331/56, 331/2, 78, 37, 57
    See application file for complete search history.

(56) References Cited

U.S. PATENT DOCUMENTS 5,625,324 A * 4/1997 Hsu et al. ...................... 331/2

FOREIGN PATENT DOCUMENTS

WO    02/11342    2/2002

* cited by examiner

*Primary Examiner*—Joseph Chang
(74) *Attorney, Agent, or Firm*—Lowe Hauptman Ham & Berner

(57) ABSTRACT

In a chaotic signal generator, a first signal generator generates a first signal. The first signal includes a first fundamental wave having a preset first frequency and a plurality of harmonic waves of the first fundamental wave. A second signal generator generates a second signal. The second signal includes a second fundamental wave having a preset second frequency and a plurality of harmonic waves of the second fundamental wave. Also, a mixer mixes the first signal from the first signal generator with the second signal from the second signal generator to generate a chaotic signal having a sum frequency of the first and second signals and the harmonic waves of the first and second signals. A filter passes a signal of a preset band out of the chaotic signal from the mixer.

17 Claims, 6 Drawing Sheets

CHAOTIC SIGNAL GENERATOR FOR ULTRA WIDE BAND COMMUNICATION SYSTEM

CLAIM OF PRIORITY

This application claims the benefit of Korean Patent Application No. 2005-60391 filed on Jul. 5, 2005 in the Korean Intellectual Property Office, the disclosure of which is incorporated herein by reference.

BACKGROUND OF THE INVENTION

1. Field of the Invention

The present invention relates to a chaotic signal generator for an ultra wide band communication system, and more particularly which incorporates an inverter type amplifier in order to reduce chip size over a conventional LC type, save unit costs of products and increase yield with superior reproducibility.

2. Description of the Related Art

In general, a chaotic signal is characterized as an aperiodic signal with no phase, and a wide band signal. A typical periodic signal has a regular phase in accordance with time and thus may be distorted or cancelled when an interference signal of an antiphase is added. However, a chaotic signal has no clear phase so that it does not interfere with any antiphase signals or proximal interference signals, even if induced thereto. This serves to protect information in the signal.

Also, at a frequency domain, the chaotic signal is uniformly sized regardless of a cycle in a wide band and exhibits superior energy efficiency.

Such a chaotic signal can be made suitable for information transmission and utilized as a carrier wave. This eliminates a need for a separate coding such as time hopping in a modem due to fewer spikes, also allowing simple configuration of a transceiver via a simple modulation method of On-Off keying (OOK).

Meanwhile, by a conventional modulation method using the chaotic signal, in principle, it is possible to transmit signals via a bandwidth corresponding to 10% to 20% of a carrier frequency band. But disadvantageously the conventional modulation method is accompanied by considerably complicated technical interpretations.

Notwithstanding such drawbacks, attempts have been made to utilize the chaotic signal due to significant advantages thereof. One advantage is that the chaotic signal ensures a communication system with higher power efficiency owing to their controllability through a small change in the system. Another advantage is that the chaotic signal fundamentally has a continuous spectrum which expands into a wider frequency bandwidth, thus applicable to the modulation where an energy spectrum is required to have no loss throughout the wide bandwidth.

FIG. 1 is a circuit diagram of a conventional chaotic signal generator.

The conventional chaotic signal generator shown in FIG. 1 is a Colpitts-type chaotic signal generator. The chaotic signal generator of FIG. 1 includes a chaotic signal generator 10 for generating a chaotic signal and a band pass filter 20 for passing the chaotic signal from the chaotic signal generator 10 through a specified frequency band.

The chaotic signal generator 10 includes power supplies $V_C$ and $V_E$, a transistor Q as an active device for forming non-linear negative resistance to generate the chaotic signal and at least three passive devices for storing energy while delaying time. The passive devices include capacitors CB, C1 and C2, an inductor L and resistors RL and RE. This chaotic signal generator 10 adopts a resonator including an energy storing device such as the inductor L for storing magnetic field energy and the capacitor C for storing electric field energy.

However, the conventional chaotic signal generator employing the resonator including the inductor L and the capacitor C requires a large chip area due to the inductor, thereby disadvantageously increasing the chip price and undermining energy efficiency due to a big energy loss on the inductor caused by CMOS.

Also, the conventional chaotic signal generator disadvantageously has poor reproducibility owing to excessive sensitivity to current when generating the chaotic signal, and lowers product yield.

SUMMARY OF THE INVENTION

The present invention has been made to solve the foregoing problems of the prior art and therefore an object according to certain embodiments of the present invention is to provide a chaotic signal generator for an ultra wide band communication system incorporating an inverter type amplifier in order to reduce chip size over a conventional LC type, save unit costs of products and enhance chip yield with superior reproducibility.

According to an aspect of the invention for realizing the object, there is provided a chaotic signal generator for an ultra wide band communication system comprising: a first signal generator for generating a first signal, the first signal including a first fundamental wave having a preset first frequency and a plurality of harmonic waves of the first fundamental wave; a second signal generator for generating a second signal, the second signal including a second fundamental wave having a preset second frequency and a plurality of harmonic waves of the second fundamental wave; a mixer for mixing the first signal from the first signal generator with the second signal from the second signal generator to generate a chaotic signal having a sum frequency of the first and second signals and the harmonic waves of the first and second signals; and a filter for passing a signal component of a preset band out of the chaotic signal from the mixer.

Each of the first and second signal generators comprises a ring-type oscillator.

The first signal from the first signal generator comprises a square wave signal. The second signal from the second signal generator comprises a square wave signal.

The first frequency of the first fundamental wave from the first signal generator is set different from the second frequency of the second fundamental wave from the second signal generator.

The first signal generator comprises: a plurality of inverter-type amplifiers connected in series; a feedback circuit having a feedback line commonly connected to input terminals and output terminals of the inverter-type amplifiers; and at least one delay circuit disposed between a signal line of the inverter-type amplifiers and the feedback line.

Each of the inverter type amplifiers has a CMOS inverter structure with a P-MOS transistor and an N-MOS transistor connected in series.

The each inverter type amplifier has a DC bias voltage applied at a midpoint where both the N-MOS transistor and the P-MOS transistor operate.

The feedback circuit comprises at least one level damping resistor.

The feedback circuit comprises a plurality of level damping resistors each disposed between the input terminal and the output terminal of each of the inverter type amplifiers.

The delay circuit comprises an RC circuit including a resistor and a capacitor.

The second signal generator comprises: a plurality of inverter-type amplifiers; a feedback circuit having a feedback line commonly connected to input terminals and output terminals of the inverter type amplifiers; and at least one delay circuit disposed between a signal line connecting the inverter type amplifiers and the feedback line.

Each of the inter-type amplifiers has a CMOS inverter structure with a P-MOS transistor and an N-MOS transistor connected in series.

The each inverter type amplifier has a DC bias voltage applied at a midpoint where both the N-MOS transistor and the P-MOS transistor operate.

The feedback circuit comprises at least one level damping resistor.

The feedback circuit comprises a plurality of level damping resistors each disposed between the input terminal and the output terminal of each of the inverter type amplifiers.

The delay circuit comprises an RC circuit including a resistor and a capacitor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
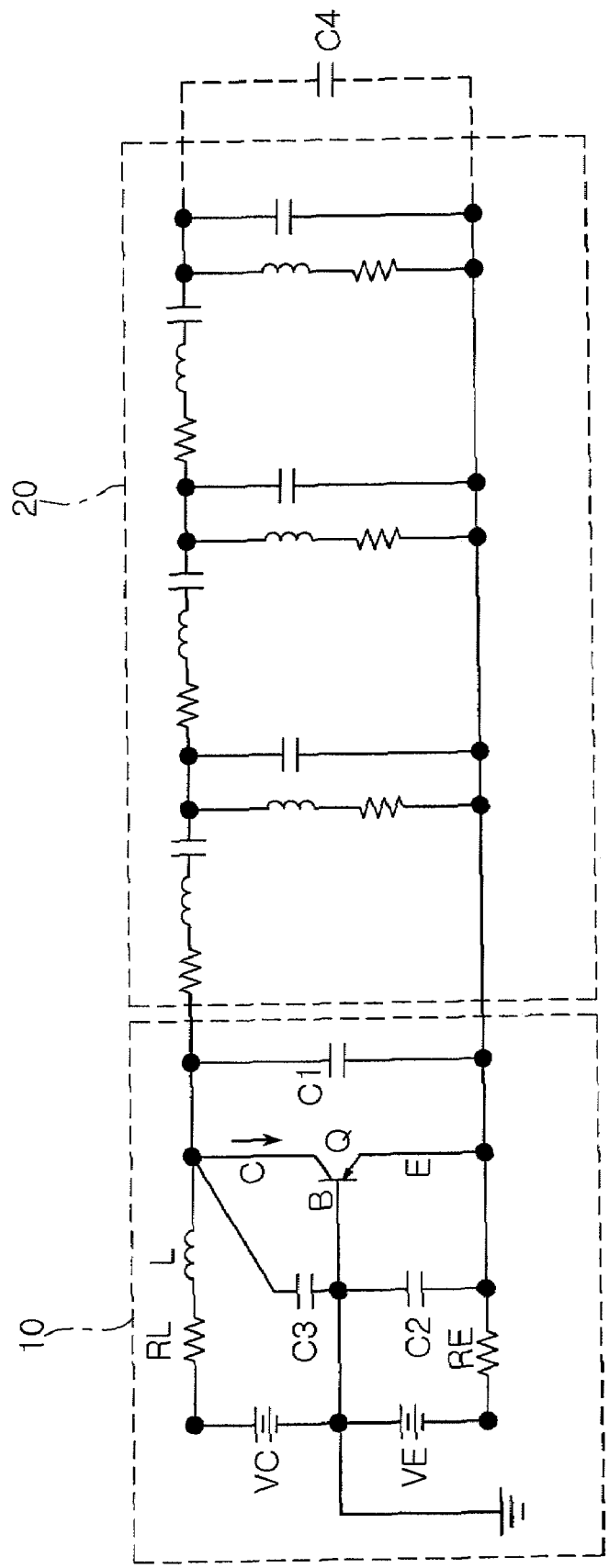
FIG. 1 is a circuit diagram illustrating a conventional chaotic signal generator.

Preferred embodiments of the present invention will now be described in detail with reference to the accompanying drawings, in which the same reference numerals are used throughout the different drawings to designate the same or similar components.

Figure 2:
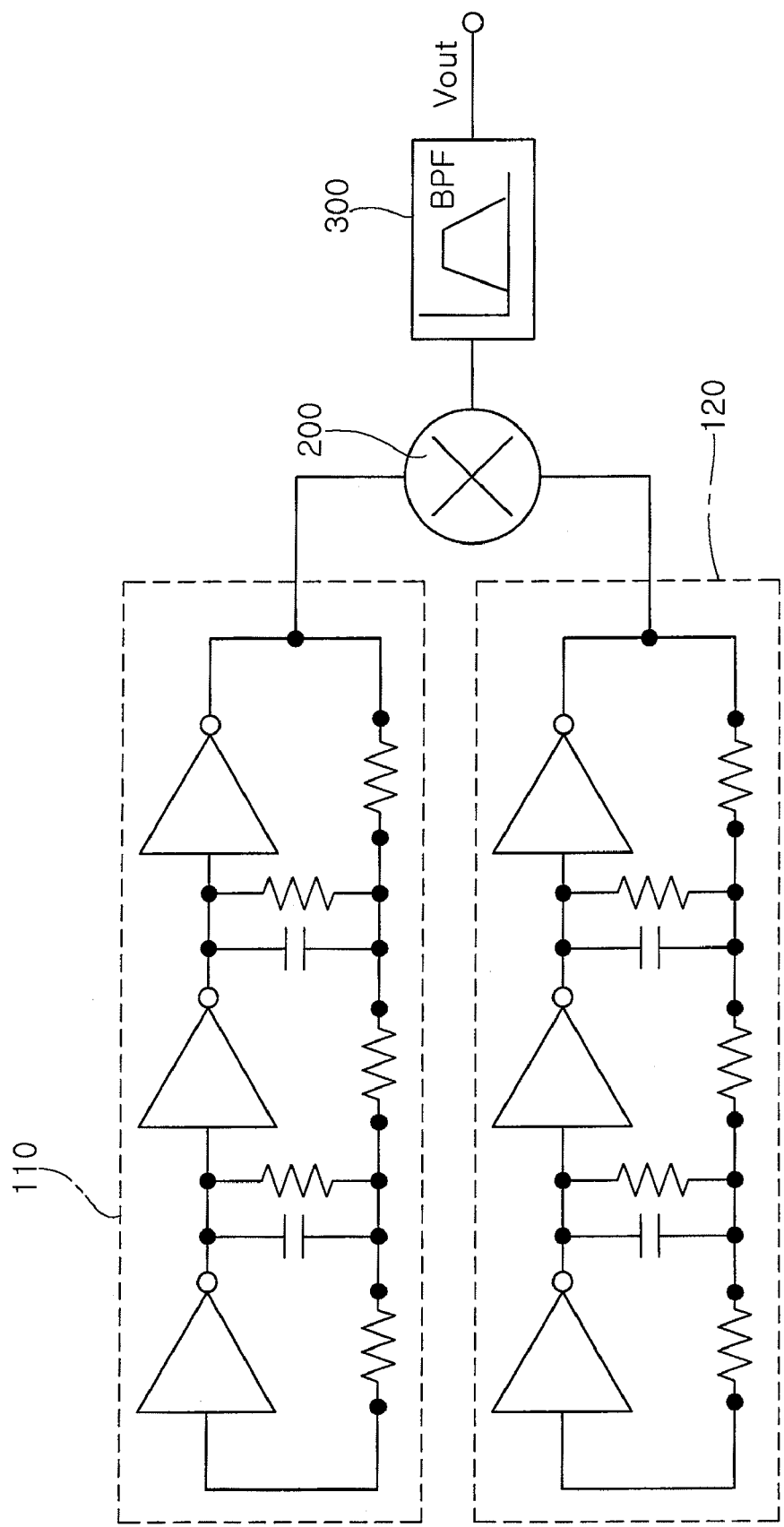
FIG. 2 is a configuration view illustrating a chaotic signal generator according to the invention.

FIG. 2 is a configuration view illustrating a chaotic signal generator of the invention.

Referring to FIG. 2, the chaotic signal generator of the invention includes a first signal generator 110, a second signal generator 120, a mixer 200 and a filter 300. The first signal generator 110 generates a first signal S1 including a first fundamental wave f1 having a preset first frequency and a plurality of harmonic waves of the first fundamental wave. The second signal generator 120 generates a second signal S2 including a second fundamental wave f2 having a preset second frequency and a plurality of harmonic waves of the second fundamental wave. Also, the mixer 200 mixes the first signal S1 from the first signal generator 110 with the second signal S2 from the second signal generator 120 to generate a chaotic signal having a sum frequency of the first and second signals S1 and S2 and the harmonic waves of the first and second signals S1 and S2. The filter 300 passes a signal component of a preset bandwidth out of the chaotic signal from the mixer 200.

The first signal S1 from the first signal generator 110 is a square wave signal including the first fundamental wave f1 and the harmonic waves of the first fundamental wave. The second signal S2 from the second signal generator 120 is also a square wave signal including the second fundamental wave f2 and the harmonic waves of the second fundamental wave. Here, the first and second signals may be a pulse, triangle or sawtooth signal.

Each of the first and second signal generators 110 and 120 generates a square wave signal with a plurality of frequencies. Thus, the each of the first and second generators may be a ring type oscillator suited to generate such a square wave signal.

Preferably, the first frequency of the first fundamental wave f1 from the first signal generator 110 is set different from the second frequency of the second fundamental wave f2 from the second signal generator 120 to generate the chaotic signal with the plurality of frequencies.

Further, the first signal generator 110 and the second signal generator 120 may be configured into a substantially equal circuit as shown in FIG. 3. However, the first fundamental wave f1 of the first signal generator 110 is set different from the second fundamental wave f2 of the second signal generator 120. FIG. 3 illustrates an exemplary configuration of the first signal generator 110 and the second signal generator 120.

Figure 3A:
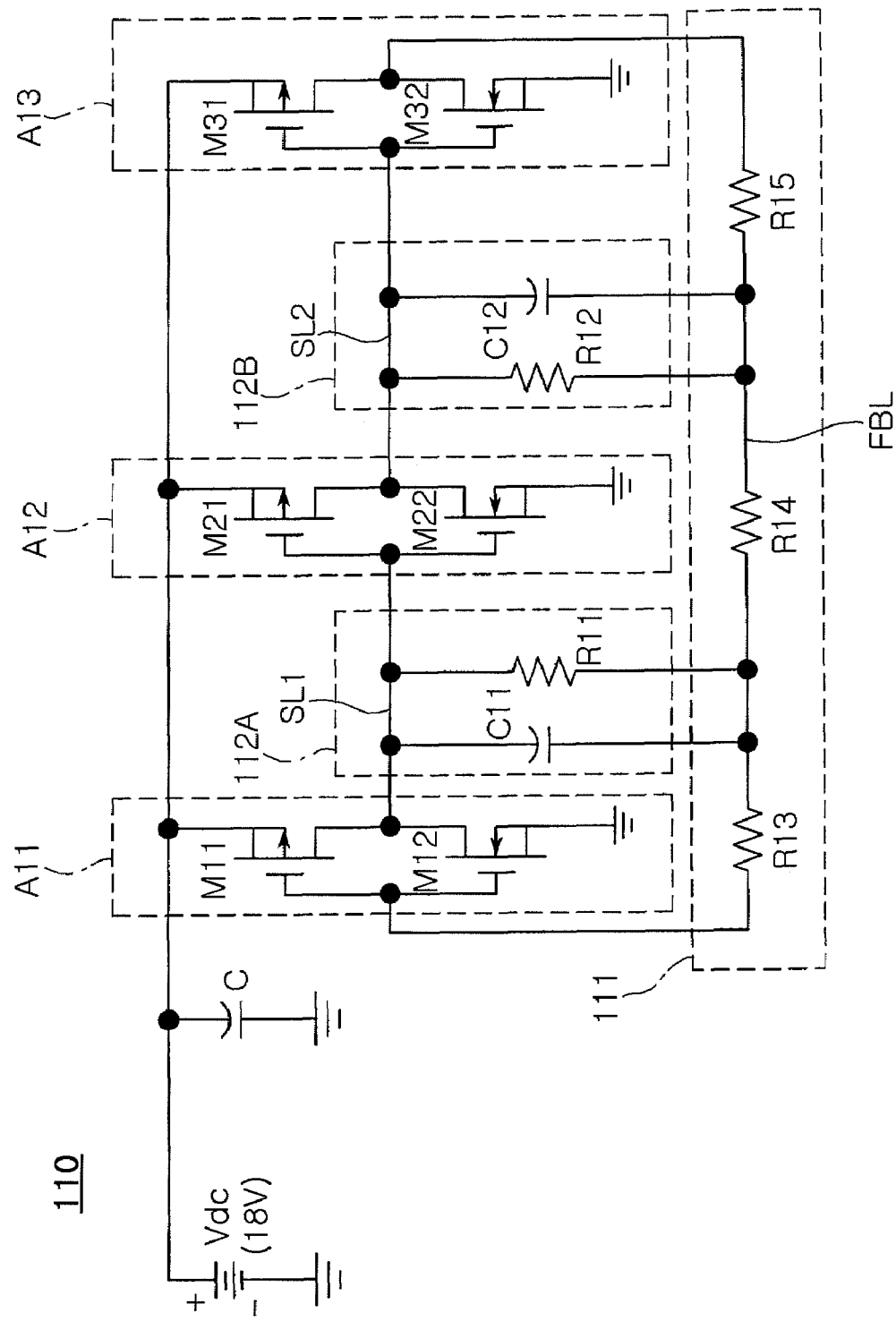
FIGS. 3a and 3b are circuit diagrams illustrating first and second signal generators of FIG. 2.
Figure 3B:
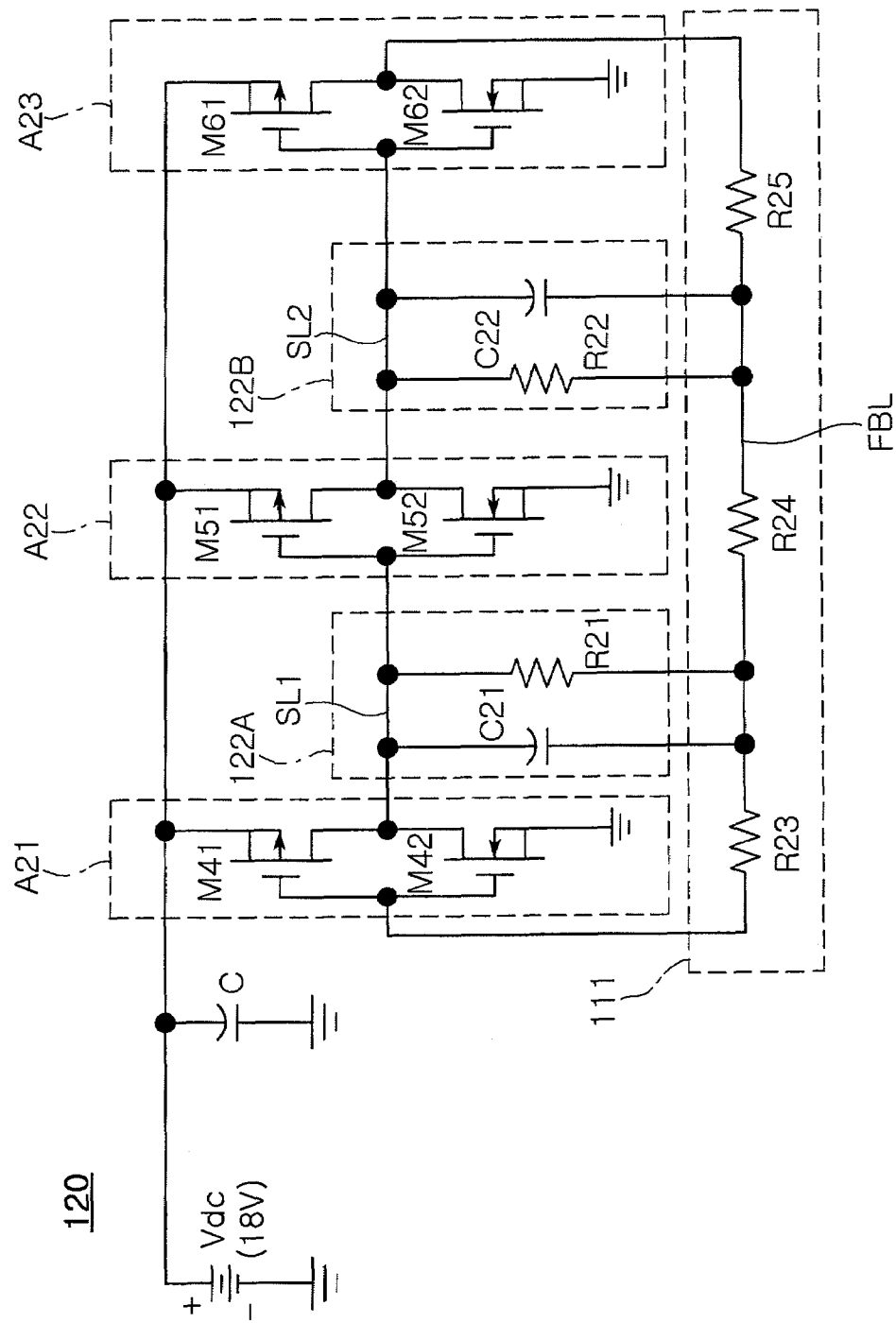

FIGS. 3a and 3b are circuit diagrams illustrating the first and second signal generators shown in FIG. 2. FIG. 3a is a circuit diagram of the first signal generator of FIG. 2, and FIG. 3b is a circuit diagram of the second signal generator of FIG. 2.

Referring to FIG. 3a, the first signal generator 110 includes a plurality of inverter-type amplifiers A11 to A13, a feedback circuit 111, and delay circuits 112A and 112B. The inverter-type amplifiers A11 to A13 are connected in series. The feedback circuit 111 has a feedback FBL commonly connected to input terminals and output terminals of the inverter-type amplifiers A11 to A13. The delay circuit 112A is disposed between a signal line SL1 and the feedback line FBL, and the delay circuit 112B is disposed between a signal line SL2 and feedback line FBL. The SL1 and SL2 connect the inverter-type amplifiers A11, A12 and A13 together.

Here, the first signal generator 110 of the invention includes the inverter type amplifiers in an odd number of three or more. That is, three, five, seven or more of such amplifiers may be adopted in cascade.

For example, in case where the first signal generator 110 includes first, second and third three amplifiers A11 to A13, the first inverter type amplifier A11 has a CMOS inverter structure with a P-MOS transistor M11 and an N-MOS transistor M12 connected in series, the second inverter type amplifier A12 has a CMOS inverter structure with a P-MOS transistor M21 and an N-MOS transistor M22 connected in series, and the third inverter type amplifier A13 also has a CMOS inverter structure with a P-MOS transistor M31 and an N-MOS transistor M32 connected in series.

Here, the first inverter type amplifier A11 has a DC bias voltage applied at a midpoint where both the N-MOS transistor M11 and the P-MOS transistor M12 operate. Likewise, the second inverter type amplifier A12 has a DC bias voltage applied at a midpoint where both the N-MOS transistor M21 and the P-MOS transistor M22 operate. Also the third inverter type amplifier A13 has a DC bias voltage applied at a midpoint where both the N-MOS transistor M31 has a DC bias voltage applied at a midpoint where the N-MOS transistor M31 and the P-MOS transistor M32 operate. Consequently, each of the first, second and third inverter type amplifiers A11 to A13 are enabled by the bias voltage Vdc.

Further, the feedback circuit 111 includes at least one level damping resistor. Preferably, the feedback circuit 111 includes a plurality of level damping resistors R13 to R15 each disposed between the input terminal and the output terminal of the each inverter type amplifier A11 to A13.

The level damping resistors R13 to R15 limits a level of an input signal which is fed back to the input terminal of the each amplifier A11 to A13, thereby preventing the overall level of the output signal from being fed back.

Each of the delay circuits 112A and 112B may be an RC circuit including a resistor and a capacitor. For example, the delay circuits 112A and 112B may be configured into an RC serial circuit, an RC parallel circuit or an RC serial and parallel circuit. Each of the delay circuits 112A and 112B of FIG. 3a is structured as an RC parallel circuit including the resistor R11 or R12 and the capacitor C11 or C12.

Further, referring to FIG. 3b, the second signal generator 120 of the invention includes a plurality of inverter-type amplifiers A21 to A23, a feedback circuit 121, and delay circuits 122A and 122B. The inverter-type amplifiers A21 to A23 are connected in series. The feedback circuit 121 has a feedback line FBL commonly connected to input terminals and output terminals of the inverter-type amplifiers. The delay circuit 122A is disposed between a signal line SL1 and the feedback line FBL, and the delay circuit 122B is disposed between a signal line SL2 and the feedback line FBL. The SL1 and SL2 connect the inverter-type amplifiers A21, A22, and A23 together.

Here, the second signal generator 120 of the invention includes the inverter type amplifiers in an odd number of three or more. That is, three, five, seven or more of such amplifiers may be adopted in cascade.

For example, in case where the second signal generator 120 includes first, second and third three amplifiers A21 to A23, the first inverter type amplifier A21 has a CMOS inverter structure with a P-MOS transistor M41 and an N-MOS transistor M42 connected in series, the second inverter type amplifier A22 has a CMOS inverter structure with a P-MOS transistor M51 and an N-MOS transistor M52 connected in series, and the third inverter type amplifier A23 also has a CMOS inverter structure with a P-MOS transistor M61 and an N-MOS transistor M62 connected in series.

Here, the first inverter type amplifier A21 has a DC bias voltage applied at a midpoint where both the N-MOS transistor M41 and the P-MOS transistor M42 operate. Likewise, the second inverter type amplifier A22 has a DC bias voltage applied at a midpoint where both the N-MOS transistor M51 and the P-MOS transistor M52 operate. Also, the third inverter type amplifier A23 has a DC bias voltage applied at a midpoint where both the N-MOS transistor M61 and the P-MOS transistor M62 operate. Consequently, each of the first, second and third inverter type amplifiers A21 to A23 is enabled by the bias voltage Vdc.

Further, the feedback circuit 121 includes at least one level damping resistor. Preferably, the feedback circuit 121 includes a plurality of level damping resistors R23 to R25 each disposed between the input terminal and the output terminal of the each of the inverter type amplifiers A21 to A23.

The level damping resistors R23 to R25 limits a level of an output signal which is fed back to the input terminal of the each amplifier A21 to A23, thereby preventing the overall level of the output signal from being fed back.

Each of the delay circuits 122A and 122B may be an RC circuit including a resistor and a capacitor. For example, the delay circuits 122A and 122B may be configured into an RC serial circuit, an RC parallel circuit or an RC serial and parallel circuit. Each of the delay circuits 122A and 122B of FIG. 3b is structured as an RC parallel circuit including the resistor R21 or R22 and the capacitor C21 or C22.

Figure 4A:
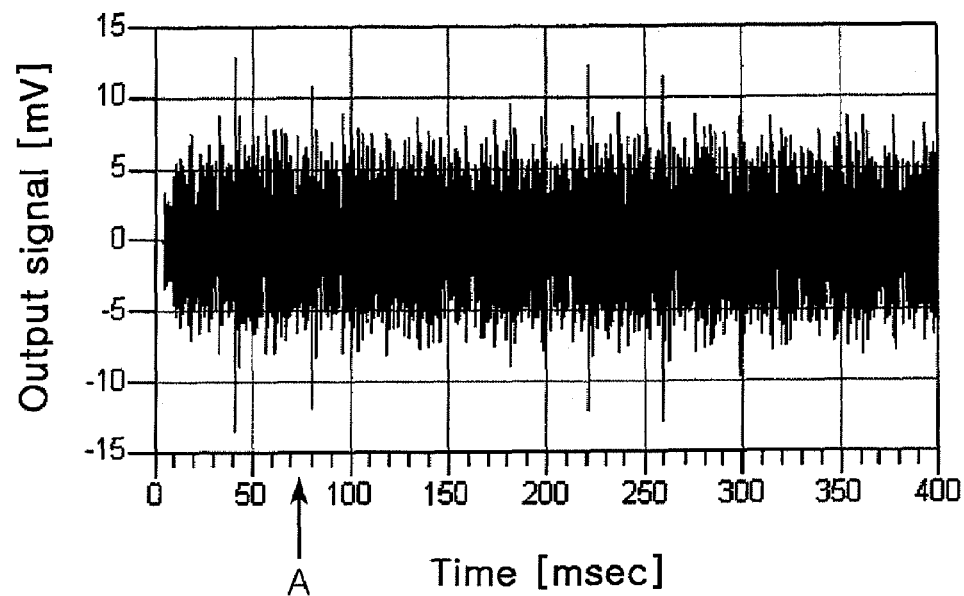
FIGS. 4a and 4b are wave diagrams illustrating an output signal at a time domain of the chaotic signal generator of FIG. 2.

FIG. 4a is a wave diagram illustrating an output signal of the chaotic signal generator of FIG. 2 at a time domain. In the wave diagram, a lateral axis denotes time [nsec] while a longitudinal axis denotes a voltage level of an input signal.

Figure 4B:
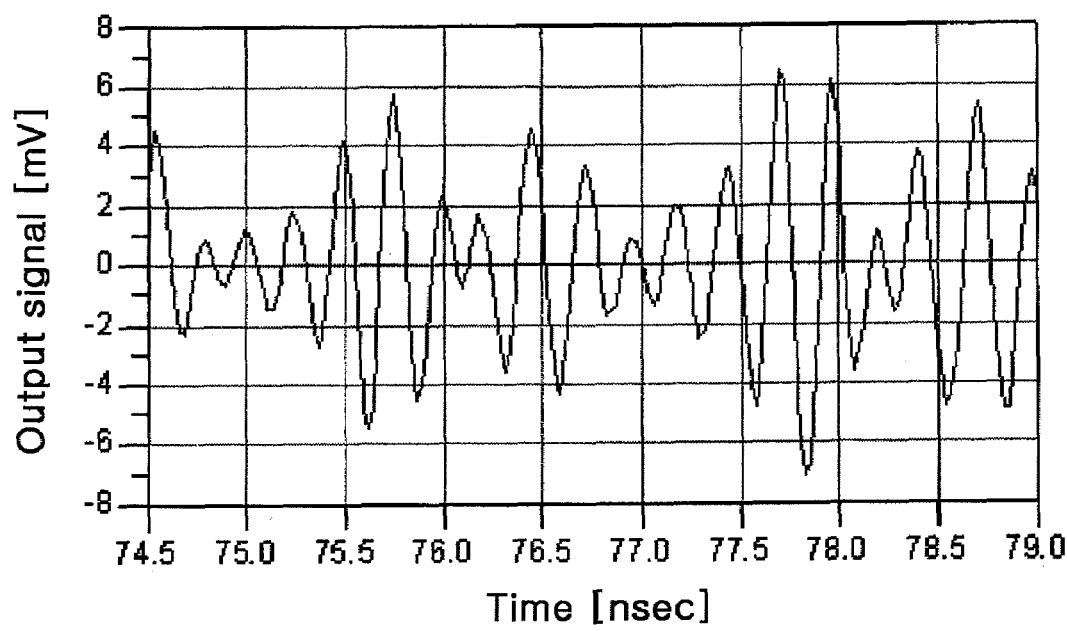

FIG. 4b is a magnified wave diagram of portion A of FIG. 4a.

Figure 5:
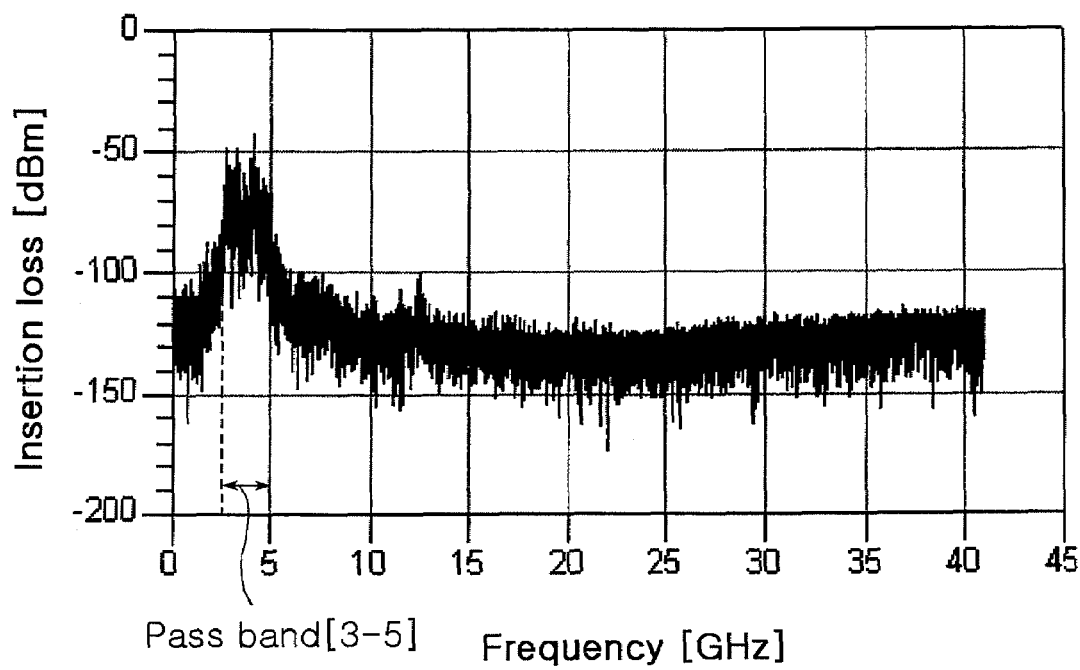
FIG. 5 is a wave diagram illustrating an output signal at a frequency domain of the chaotic signal generator of FIG. 2.

FIG. 5 is a wave diagram illustrating an output signal of the chaotic signal generator of FIG. 2 at a frequency domain.

In the wave diagram of FIG. 5, a lateral axis denotes a frequency [GHz] of an output signal and a longitudinal axis denotes insertion loss of an input signal.

Figure 6:
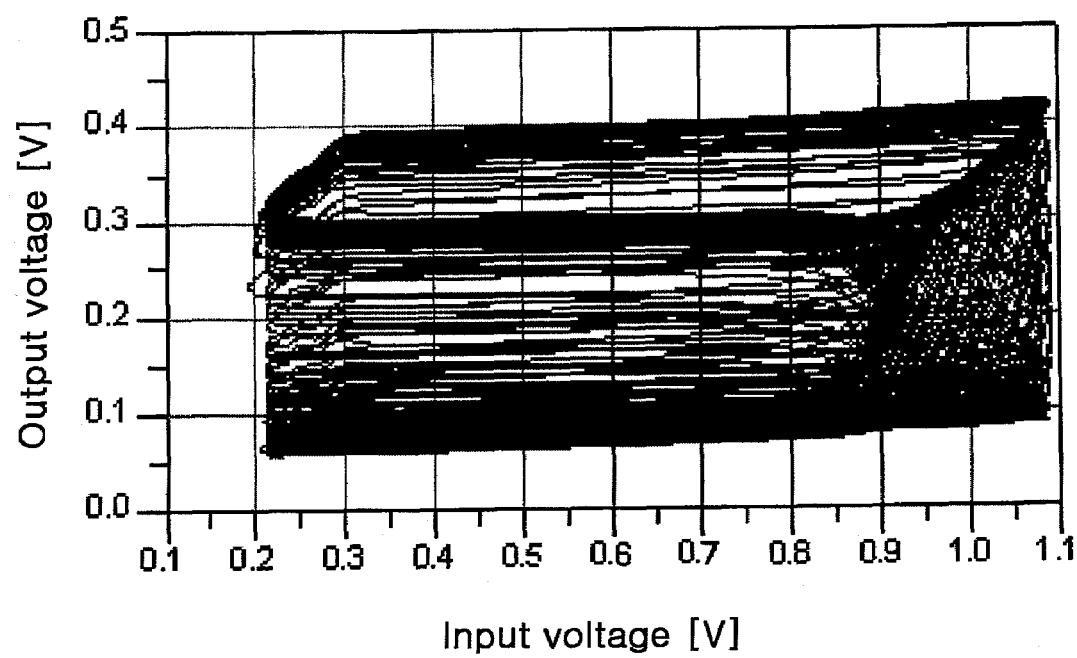
FIG. 6 is a trajectory view illustrating an input voltage and an output voltage of a mixer of FIG. 2.

FIG. 6 is a trajectory diagram illustrating an input voltage and an output voltage of a mixer shown in FIG. 2.

In FIG. 6, a lateral axis denotes the input voltage of the mixer and a longitudinal axis denotes the output voltage of the mixer. With the chaotic signal generator of the invention, output voltages are obtained along a plurality of trajectories from an input voltage.

Operations and effects of the invention will be given in detail hereunder with reference to the accompanying drawings.

The operation of the chaotic signal generator of the invention will be explained with reference to FIGS. 2 to 6. First, referring to FIG. 2, the chaotic signal generator of the invention includes a first signal generator 110, a second signal generator 120, a mixer 200 and a filter 300. The first signal generator generates a first signal S1 including a first fundamental wave f1 having a preset first frequency and a plurality of harmonic waves of the first fundamental wave. The first signal S1 is a square wave with a plurality of frequencies.

For example, if the first frequency of the first fundamental wave f1 of the first signal S1 is 1 GHz, the harmonic waves thereof are 2 GHz, 4 GHz, 8 GHz . . . .

The second signal generator 120 of the invention generates a second signal S2 including a second fundamental wave f2 having a preset second frequency and a plurality of harmonic waves of the second fundamental wave. The second signal S2 is also a square wave with a plurality of frequencies.

For example, if the second frequency of the second fundamental wave f2 of the second signal S2 is 0.9 GHz, the harmonic waves thereof are 1.8 GHz, 3.6 GHz, 7.24 GHz, . . .

Here, in the chaotic signal generator of the invention, preferably, the first frequency of the first fundamental wave f1 is set different from the second frequency of the second fundamental wave f2 to generate the chaotic signal with the plurality of frequencies.

The first signal generator 110 will be explained with reference to FIGS. 3a and 3b.

Referring to FIG. 3a, the first signal generator 110 includes first to third inverter type amplifiers A11 to A13 connected in series. The first inverter type amplifier A11 has a CMOS inverter structure with a P-MOS transistor M11 and an N-MOS transistor M12 connected in series. The second inverter type amplifier A12 has a CMOS inverter structure with a P-MOS transistor M21 and an N-MOS transistor M22 connected in series. Also, the third inverter type amplifier A13 has a CMOS inverter structure with a P-MOS transistor M31 and an N-MOS transistor M32 connected in series. Further, the first inverter type amplifier A11 has a bias voltage Vdc applied at a midpoint where both the N-MOS transistor M11 and the P-MOS transistor M12 operate. Likewise, the second inverter type amplifier A12 has a bias voltage Vdc applied at a midpoint where both the N-MOS transistor M21 and the P-MOS transistor M22 operate. Also, the third inverter type amplifier A13 has a bias voltage Vdc applied at a midpoint where both the N-MOS transistor M31 and the P-MOS transistor M32 operate. At this time, the first to third amplifiers are enabled by the bias voltage Vdc.

Then each output of the first to third amplifiers A11 to A13 is fed back to each of the input terminals through the feedback circuit 111. The signals fed back or inputted are delayed for a preset time by the delay circuits 112A and 112B.

In this fashion, the fed back signals delayed for a preset time generate signals with different phases and also square wave signals with a plurality of frequencies. Here, the feedback circuit 111 includes a plurality of level damping resistors R13 to R15 for limiting a level of the fed back signals to prevent an overall level of the output signals from the first signal generator 110 from being fed back.

Referring to FIG. 3b, the second signal generator 120 includes first to third inverter type amplifiers A21 to A23 connected in series. The first inverter type amplifier A21 has a CMOS inverter structure with a P-MOS transistor M41 and an N-MOS transistor M22 connected in series. The second inverter type amplifier A21 has a CMOS inverter structure with a P-MOS transistor M51 and an N-MOS transistor M52 connected in series. The third inverter type amplifier A23 also has a CMOS inverter structure with a P-MOS transistor M61 and an N-MOS transistor M62 connected in series. Further, the first inverter type amplifier A21 has a bias voltage Vdc applied at a midpoint where both the N-MOS transistor M41 and the P-MOS transistor M42 operate. The second inverter type amplifier A22 has a bias voltage Vdc applied at a midpoint where both the N-MOS transistor M51 and the P-MOS transistor M52 operate. Also, the third inverter type amplifier A23 has a bias voltage Vdc applied at a midpoint where both the N-MOS transistor M61 and the P-MOS transistor M62 operate. Here, the first to third inverter type amplifiers A21 to A23 are enabled by the bias voltage Vdc.

Each of the output signals of the first to third inverter type amplifiers A21 to A23 is fed back to each of the input terminals through the feedback circuit 121. In this case, the signals fed back and inputted are delayed for a preset time by the delay circuits 122A and 122B.

In this fashion, the feedback signals delayed for a preset time generate signals with different phases and also square wave signals with a plurality of different frequencies. The feedback circuit 121 includes a plurality of level damping resistors R23 to R25 for limiting a level of the fed back signals to prevent the overall level of the output signals from the second signal generator 120 from being fed back.

As described above, in case where a first frequency of a first fundamental wave f1 of the first signal S1 is 1 GHz, harmonic waves thereof are 2 GHz, 4 GHz, 8 GHz . . . . In case where a second frequency of a second fundamental wave f2 of the second signal S2 is 0.9 GHz, harmonic waves thereof are 1.8 GHz, 3.6 GHz, 7.24 GHz, . . . Accordingly, different frequencies interfere with each other, thus generating a chaotic signal having complicated frequencies as shown in FIGS. 4 and 5.

Next, referring to FIG. 2, the mixer of the invention 200 mixes the first signal S1 from the first signal generator 110 with the second signal S2 from the second generator to generate the chaotic signal having a sum frequency of the first signal S1 and the second signal S2 and the harmonic waves from the first signal S1 and the second signal S2.

For example, in case where the first fundamental wave f1 of the first signal S1 and harmonic waves thereof, and the second fundamental wave f2 of the second signal S2 and harmonic waves thereof are mixed with one another, a sum frequency f1+f2 and a difference frequency f1−f2 or f2−f1 of the first and second signals S1, S2 and harmonic waves thereof 2f1, 3f1, 4f1, . . . and 2f2, 3f2, 4f2, . . . are outputted. Therefore the mixer 200 of the invention outputs the chaotic signal with a great many frequencies.

As shown in FIG. 4, the chaotic signal, at a time domain, has a combination of a plurality of phases instead of a specific phase.

As described above, the chaotic signal outputted from the mixer 200 is distributed very extensively across an ultra wide band. In employing the chaotic signal in the communication system, it is necessary to select the chaotic signal corresponding to a specific band for use in the system, such as a carrier wave.

Then, referring to FIG. 2, the filter of the invention 300 passes a signal component of a preset band out of the chaotic signal from the mixer and provides the chaotic signal at a desired frequency band.

Further, referring to FIG. 5, at a frequency domain, an output signal from the chaotic signal generator of the invention has a plurality of frequencies instead of a specific frequency. For example, in case where the filter 300 of the invention has a pass band set at about 3 to 5 GHz, as shown in FIG. 5, it outputs the chaotic signal in the range of 3 to 5 GHz.

In addition, as shown in FIG. 6, the chaotic signal generator demonstrates that the mixer outputs complicated trajectories of output voltages with respect to an input voltage due to complicated frequencies with different levels.

A chaotic signal generator which employs a conventional resonator including a conventional inductor L and a capacitor requires a big-sized circuit in implementing a chip owing to the inductor. This disadvantageously increases the chip price and results in poor reproducibility due to excessive sensitivity to current when generating a chaotic signal. However the chaotic signal generator of the invention overcomes the conventional drawbacks by adopting an inverter type amplifier in place of an LC resonator.

As set forth above, a chaotic signal generator for an ultra wide band communication system of the invention employs an inverter type amplifier in order to reduce chip size over a conventional LC type, save unit costs of products and boost chip yield with excellent reproducibility.

While the present invention has been shown and described in connection with the preferred embodiments, it will be apparent to those skilled in the art that modifications and variations can be made without departing from the spirit and scope of the invention as defined by the appended claims.

What is claimed is:

1. A chaotic signal generator for an ultra wide band communication system comprising:

a first signal generator for generating a first signal, the first signal including a first fundamental wave having a preset first frequency and a plurality of harmonic waves of the first fundamental wave;

a second signal generator for generating a second signal, the second signal including a second fundamental wave having a preset second frequency and a plurality of harmonic waves of the second fundamental wave;

a mixer for mixing the first signal from the first signal generator with the second signal from the second signal generator to generate a chaotic signal having a sum frequency of the first and second signals and the harmonic waves of the first and second signals; and a filter for passing a signal component of a preset band out of the chaotic signal from the mixers, wherein the first signal generator comprises:

a plurality of inverter-type amplifiers connected in series;

a feedback circuit having a feedback line commonly connected to input terminals and output terminals of the inverter-type amplifiers; and at least one delay circuit disposed between a signal line of the inverter-type amplifiers and the feedback line.

2. The chaotic signal generator according to claim 1, wherein each of the first and second signal generators comprises a ring-type oscillator.

3. The chaotic signal generator according to claim 1, wherein the first signal from the first signal generator comprises a square wave signal.

4. The chaotic signal generator according to claim 3, wherein the second signal from the second signal generator comprises a square wave signal.

5. The chaotic signal generator according to claim 3, wherein the first frequency of the first fundamental wave from the first signal generator is set different from the second frequency of the second fundamental wave from the second signal generator.

6. The chaotic signal generator according to claim 1, wherein each of the inverter type amplifiers has a CMOS inverter structure with a P-MOS transistor and an N-MOS transistor connected in series.

7. The chaotic signal generator according to claim 6, wherein the each inverter type amplifier has a DC bias voltage applied at a midpoint where both the N-MOS transistor and the P-MOS transistor operate.

8. The chaotic signal generator according to claim 1, wherein the feedback circuit comprises at least one level damping resistor.

9. The chaotic signal generator according to claim 1, wherein the feedback circuit comprises a plurality of level damping resistors each disposed between the input terminal and the output terminal of each of the inverter type amplifiers.

10. The chaotic signal generator according to claim 1, wherein the delay circuit comprises an RC circuit including a resistor and a capacitor.

11. The chaotic signal generator according to claim 1, wherein the second signal generator comprises:

a plurality of inverter-type amplifiers;

a feedback circuit having a feedback line commonly connected to input terminals and output terminals of the inverter type amplifiers; and at least one delay circuit disposed between a signal line connecting the inverter type amplifiers and the feedback line.

12. The chaotic signal generator according to claim 11, wherein each of the inter-type amplifiers has a CMOS inverter structure with a P-MOS transistor and an N-MOS transistor connected in series.

13. The chaotic signal generator according to claim 12, wherein the each inverter type amplifier has a DC bias voltage applied at a midpoint where both the N-MOS transistor and the P-MOS transistor operate.

14. The chaotic signal generator according to claim 12, wherein the feedback circuit comprises at least one level damping resistor.

15. The chaotic signal generator according to claim 12, wherein the feedback circuit comprises a plurality of level damping resistors each disposed between the input terminal and the output terminal of each of the inverter type amplifiers.

16. The chaotic signal generator according to claim 12, wherein the delay circuit comprises an RC circuit including a resistor and a capacitor.

17. A chaotic signal generator for an ultra wide band communication system comprising:

a first signal generator for generating a first signal, the first signal including a first fundamental wave having a preset first frequency and a plurality of harmonic waves of the first fundamental wave;

a second signal generator for generating a second signal, the second signal including a second fundamental wave having a preset second frequency and a plurality of harmonic waves of the second fundamental wave;

a mixer for mixing the first signal from the first signal generator with the second signal from the second signal generator to generate a chaotic signal having a sum frequency of the first and second signals and the harmonic waves of the first and second signals; and a filter for passing a signal component of a preset band out of the chaotic signal from the mixer, wherein at least one of the first signal generator and the second signal generator further comprises:

a plurality of inverter-type amplifiers connected in series;

a feedback circuit having a feedback line commonly connected to input terminals and output terminals of the inverter-type amplifiers; and at least one delay circuit disposed between a signal line of the inverter-type amplifiers and the feedback line.

* * * * *

UNITED STATES PATENT AND TRADEMARK OFFICE
CERTIFICATE OF CORRECTION

PATENT NO. : 7,463,103 B2  Page 1 of 1
APPLICATION NO. : 11/428786
DATED : December 9, 2008
INVENTOR(S) : Kwang Du Lee et al.

It is certified that error appears in the above-identified patent and that said Letters Patent is hereby corrected as shown below:

On the title page:
Item (73) Assignee: "Samsung Electronic-Mechanics Co., Ltd." should be --Samsung Electro-Mechanics Co., Ltd.--

Signed and Sealed this

Third Day of March, 2009

JOHN DOLL
*Acting Director of the United States Patent and Trademark Office*